United States Patent Office 2,741,614
Patented Apr. 10, 1956

2,741,614

N-ISOBUTYLNORMORPHINE COMPOUNDS

Robert L. Clark, Woodbridge, N. J., assignor to Merck & Co., Inc., Rahway, N. J., a corporation of New Jersey No Drawing. Application November 22, 1952, Serial No. 322,145

6 Claims. (Cl. 260—285)

This invention is concerned generally with novel derivatives of morphine and with processes for preparing these morphine derivatives. More particularly, it relates to N-isobutylnormorphine, to the lower alkanoyl esters of N-isobutylnormorphine, and acid salts thereof, new compounds which are active as morphine antagonists, and to the process of preparing these new morphine antagonists starting with normorphine.

N-isobutylnormorphine, its lower alkanoyl esters, and acid salts thereof, subject of the present invention, may be chemically represented by the following structural formulae:

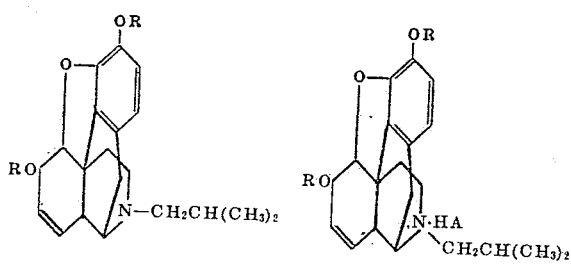

wherein R is hydrogen or a lower alkanoyl radical, and HA is an acid.

The chemical relationship of N-isobutylnormorphine, and its esters, to morphine is clear from a comparison of the foregoing formulae with the structural formula of morphine which is as follows:

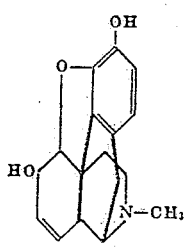

Whereas the alkaloid morphine is a potent analgesic, I have found that N-isobutylnormorphine, its esters, and acid salts thereof, are strong morphine antagonists and prevent or abolish the analgesic action of morphine when utilized in conjunction with that drug. This antagonistic action possessed by N-isobutylnormorphine is particularly surprising in view of the fact that other N-alkyl-normorphine compounds such as N-ethylnormorphine, N-n-butylnormorphine, N-n-amylnormorphine, N-n-hexyl-normorphine exhibit no appreciable morphine antagonist activity.

The N-isobutylnormorphine, its lower alkanoyl esters, and acid salts thereof, can be prepared by reactions which may be chemically represented as follows:

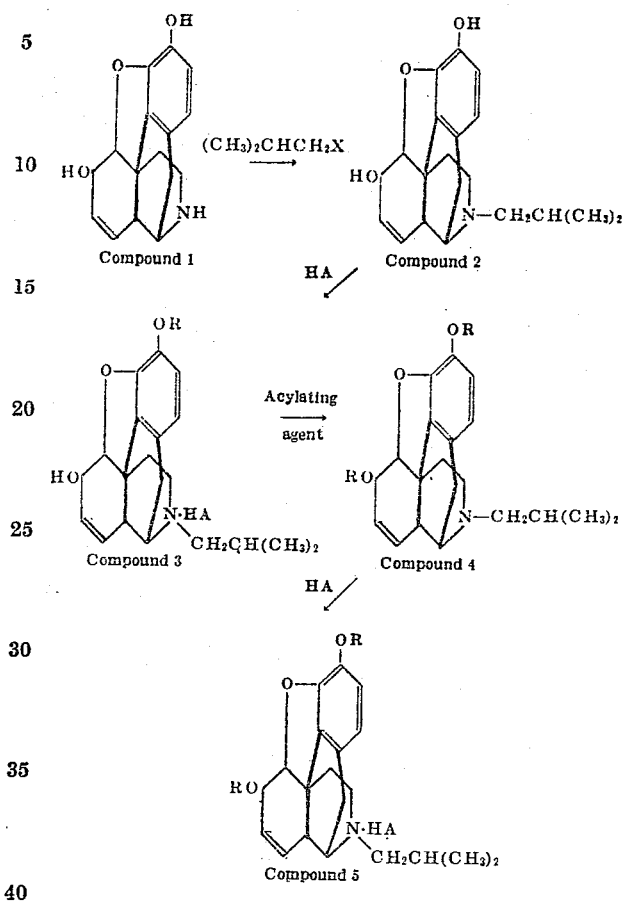

wherein R is a lower alkanoyl radical and HA is an acid.

The reactions indicated hereinabove, are carried out as follows: normorphine (Compound 1) is reacted with an isobutyl halide thereby forming N-isobutylnormorphine (Compound 2); the latter compound is reacted with an acid to produce the corresponding acid salt of N-isobutyl-normorphine (Compound 3); alternatively the N-isobutyl-normorphine is reacted with a lower alkanoic anhydride thereby producing the corresponding 3,6-dialkanoyl-N-isobutyl-normorphine (Compound 4) which is converted by reaction with an acid to the corresponding acid salt of 3,6-dialkanoyl-N-isobutyl-normorhpine (Compound 5).

The reaction between the normorphine and isobutyl halide is ordinarily conducted by heating the reactants together in contact with an acid binding agent in a liquid medium which is substantially inert under the reaction conditions and which is a solvent for the reactants. I prefer to utilize as the liquid medium a lower aliphatic alcohol such as methanol, ethanol, propanol, and the like. The liquid medium employed should be substantially free of water. As the acid binding agent, I ordinarily utilize an alkali metal carbonate such as sodium carbonate, potassium carbonate, an alkali metal bicarbonate such as sodium bicarbonate, potassium bicarbonate, an alkaline earth metal carbonate such as calcium carbonate, barium carbonate, and the like. I prefer to conduct the reaction by bringing together, in an organic solvent, approximately equimolar quantities of normorphine and an isobutyl halide such as isobutyl chloride, isobutyl bromide, isobutyl iodide, and the like, and heating the mixture under reflux in contact with an excess of the binding agent for an extended period of time. I have found that, under these reaction conditions, a heating period of about eight hours or more is ordinarily required to complete the reaction between the normorphine and the isobutyl halide.

The N-isobutylnormorphine thus obtained is conveniently recovered by evaporating the organic solvent from the reaction mixture, preferably under reduced pressure, and extracting the residual material with a hot chlorinated solvent such as chloroform. The chlorinated solvent extract is filtered thereby removing any unreacted normorphine which is insoluble in chlorinated solvents, and the filtered solution is evaporated to dryness to give crude N-isobutylnormorphine, which can be rendered crystalline by trituration with ether or petroleum ether, and the resulting crystalline product purified by recrystallization from aqueous lower aliphatic alcohols such as methanol and ethanol.

The N-isobutylnormorphine is then reacted with a lower alkanoic anhydride such as acetic anhydride, propionic anhydride, and the like, thereby esterifying the hydroxyl radicals in the 3 and 6-positions of the molecule to form the corresponding 3,6-dialkanoyl-N-isobutyl-normorphine such as 3,6-diacetyl-N-isobutyl-normorphine; 3,6-dipropionyl-N-isobutyl-normorphine; 3,6-dibutyryl-N-isobutyl-normorphine, and the like. The reaction between the alkanoic acid anhydride and the N-isobutylnormorphine is ordinarily conducted by heating a mixture of the reactants to a temperature of about 120° C. for a period of about one to two hours. The reaction mixture is then evaporated under reduced pressure, the residual material triturated with water thereby hydrolyzing excess alkanoic anhydride, the aqueous mixture is cooled, and the crystalline material is recovered by filtration and dried to give substantially pure 3,6-dialkanoyl-N-isobutylnormorphine.

The conversion of the N-isobutylnormorphine or its lower alkanoyl ester, 3,6-dialkanoyl-N-isobutyl-normorphine to the corresponding acid salts is ordinarily conducted by reacting the N-isobutylnormorphine or the 3,6-dialkanoyl-N-isobutyl-normorphine under substantially anhydrous conditions, with an acid as for example, hydrogen chloride, hydrogen bromide, sulfuric acid, acetic acid, tartaric acid, citric acid, and the like. This salt-forming reaction is conveniently carried out by dissolving the N-isobutylnormorphine in a hot lower alkanol, such as ethanol, methanol, propanol, and the like, and adding to the solution a slight excess of an alcoholic solution of the appropriate acid. Upon diluting the resulting alcoholic reaction medium with an alcohol-miscible non-solvent for the product, such as diethyl ether, there crystallizes from the mixture the acid salt of N-isobutyl-normorphine, or the acid salt of 3,6-dialkanoyl-N-isobutyl-normorphine, such as N-isobutylnormorphine hydrochloride, N-isobutylnormorphine hydrobromide, N-isobutyl-normorphine sulfate, N-isobutylnormorphine acetate, N-isobutylnormorphine tartrate, 3,6-diacetyl-N-isobutyl-normorphine hydrochloride; 3,6-diacetyl-N-isobutyl-normorphine hydrobromide, 3,6-diacetyl-N-isobutyl-normorphine sulfate, 3,6-diacetyl-N-isobutyl-normorphine acetate, 3,6-diacetyl-N-isobutyl-normorphine tartrate; 3,6-dipropionyl-N-isobutyl-normorphine hydrochloride; 3,6-dipropionyl-N-isobutyl-normorphine hydrobromide; 3,6-dipropionyl-N-isobutyl-normorphine sulfate, 3,6-dibutyryl-N-isobutyl-normorphine hydrochloride; 3,6-dibutyryl-N-isobutyl-normorphine acetate; 3,6-dibutyryl-N-isobutyl-normorphine tartrate; 3,6-dibutyryl-N-isobutyl-normorphine hydrobromide; 3,6-dibutyryl-N-isobutyl-normorphine sulfate, and the like, and the salt thus formed is recovered from the alcoholic slurry by filtration or centrifugation.

The following examples illustrate methods of carrying out the present invention, but it is to be understood that these examples are given for purposes of illustration and not of limitation.

Example 1

A mixture of 6.0 g. of normorphine, 2.68 g. of sodium bicarbonate, 4.05 g. (2.52 ml.) of isobutyl iodide, and 100 ml. of n-propanol is heated under reflux with stirring for a period of twenty-four hours. At the end of this period, the reaction mixture is filtered thereby removing insoluble material. The filtered solution is evaporated to dryness under reduced pressure, and the residual material is extracted with 100 ml. of hot chloroform leaving a small amount of tan-colored, solid material. The chloroform extract is evaporated to dryness, and the residual material is triturated with ether. The resulting crystalline material is recovered by filtration, combined with the chloroform-insoluble product isolated hereinabove, and the mixture is extracted with ether, using a Soxhlet apparatus, for a period of about eight hours. The ethereal extract is evaporated to dryness, and the crude N-isobutylnormorphine thus obtained is recrystallized several times from absolute ethanol to give substantially pure N-isobutylnormorphine; M. P. 209–210° C.; $[\alpha]_D^{25} = -140°$.
Analysis.—Calc'd for $C_{20}H_{25}NO_3$: C, 73.39; H, 7.70. Found: C, 73.36; H, 7.50.

Example 2

One and one-half grams of N-isobutylnormorphine (free base) is dissolved in 20 ml. of absolute ethanol, and the solution is acidified with an ethanol solution of hydrogen chloride. Thirty milliliters of diethyl ether is added to the acidified solution, whereupon an amorphous solid precipitates which is removed and recrystallized twice from methanol to give N-isobutylnormorphine hydrochloride.

Example 3

A mixture of 1.5 g. of N-isobutylnormorphine and 10 ml. of acetic anhydride is heated under reflux for a period of one and one-half hours. The reaction mixture is evaporated substantially to dryness under reduced pressure and to the residual material is added approximately 3 g. of chopped ice. The resulting aqueous solution is neutralized with ammonium hydroxide and the precipitated material is recovered and recrystallized twice from absolute ethanol to give N-isobutyl-normorphine diacetate.

Various changes and modifications may be made in carrying out the present invention without departing from the spirit and scope thereof. Insofar as these changes and modifications are within the purview of the annexed claims, they are to be considered as part of my invention.

I claim:
1. A compound selected from the group which consists of N-isobutylnormorphine, its lower alkanoyl esters, and acid addition salts thereof.
2. N-isobutylnormorphine.
3. 3,6-diacetyl-N-isobutyl-normorphine.
4. N-isobutylnormorphine hydrochloride.
5. N-isobutylnormorphine sulfate.
6. N-isobutylnormorphine tartrate.

References Cited in the file of this patent

UNITED STATES PATENTS

| | | |
|---|---|---|
| 2,344,833 | Weijlard | Dec. 12, 1944 |
| 2,625,566 | Heinzelmann | Jan. 13, 1953 |

FOREIGN PATENTS

| | | |
|---|---|---|
| 191,088 | Germany | June 9, 1904 |

OTHER REFERENCES

Braun: Ber 49, 977–89 (1916).
Bergel: Quarterly Review of Chem. Soc., vol. II, #4, p. 356 (1948).
Craig: Chem. Review, vol. 42, p. 395 (1948).